United States Patent Office 3,310,508
Patented Mar. 21, 1967

3,310,508
MIXTURE FOR IMPROVING THE CHEMICO-PHYSICAL PROPERTIES OF BLENDS CONSISTING OF NATURAL RUBBER AND 1:4-CIS-POLYBUTADIENE
Hrischikesch C. Roy, Grafelfing, near Munich, Germany, assignor to Metzeler Gummiwerke Aktiengesellschaft, Munich, Germany
No Drawing. Filed July 18, 1963, Ser. No. 296,097
1 Claim. (Cl. 260—5)

The present invention relates to a mixture for improving the chemico-physical properties of blends consisting of natural rubber and 1:4-cis-polybutadiene to which have been added ageing inhibitors derived from an amine basis, additionally to the usual substances such as oil (plasticizer) zinc oxide, stearic acid, binders and soot.

The discovery of the application of 1:4-cis-polybutadiene introduced numerous difficulties for the user thereof, since its treatment and purposeful use necessitates a far-reaching modification of the way of thinking of the experts which had heretofore been substantially conventional. The best results were achieved heretofore when 60 parts 1:4-cis-polybutadiene were blended with 40 parts of natural rubber and with 1.5 to 1.75 parts of elementary sulphur, 0.8 to 0.9 parts of a sulphenamide accelerator, e.g. N-oxy-diethylbenzothiacylsulphenamide and 18 parts of a high aromatic oil and 60 parts of soot. This recipe as well as all other previous developments of 1:4-cis-polybutadiene mixtures is based on the assumption of the conventional theory and on a vulcanisation system which permits of various interpretations. All sulphenamide accelerator types used for this purpose in Germany and elsewhere give broadly speaking the same results, the physical values being substantially the same even after ageing. Even if the mixtures with 1:4-cis-polybutadiene known heretofore lead already to good practical results nevertheless a large field of work for the production of even better mixtures is still left open.

When natural rubber and 1:4-cis-polybutadiene are compared it is found that natural rubber consists not only of cis-C(CH$_3$)=CH—, but it contains also 2.2% CH$_2$=(CH$_3$)—, 4.35% vegetable albumin, 16.35% bitter substances, which are rich in nitro compounds, and 6.65% extractable substances. In contrast 1:4-cis-polybutadiene is a synthetic product having an exactly defined structure with a cis content of at least 92%, without the additions contained in the natural rubber. These additions to the natural rubber are not only troublesome in a vulcanisate but act even positively. A portion of the additions contained in the natural rubber must be considered to act as an ageing resistor; this is already known. Moreover the relatively large quantity of nitrogen-containing substances in vulcanisates of natural rubber causes nitrogen compounds which are more stable than the C—C—, C—S— or C—S—S—C— bonds. The natural bond of the isoprene molecules of the natural rubber is based on a condensation process in a watery medium, whereas the production of the synthetic polymers, e.g. of the 1:4-cis-polybutadiene requires a polymerisation process. Therefore the same difference exists in this case between these two mechanisms as between urea formaldehyde resin production (polycondensation) and polyethylene production (polymerisation).

Investigations have shown that elementary sulphur has a deleterious effect on the 1:4-cis-polybutadiene-rubber and thereby favours a conversion from the cis- form to the trans-form, a process which does not occur in natural rubber. 1.5 parts of elementary sulphur are quite sufficient for initiating this conversion. On the other hand this sulphur content represents the smallest possible quantity which must be contained in the mixtures for attaining the required good physical properties. Since the above-mentioned conversion does not occur in natural rubber it must be assumed that the various alien components of the natural rubber prevent the conversion or reorientation. The kind of cis-configuration can be determined and measured by infra-red spectroscopy. The change of the physical values of the mixture types may be seen also from the physical values before and after ageing.

It is an object of the present invention to develop a new vulcanisation system by means of which the latent possibilities provided by the new 1:4-cis-polybutadiene can be utilised more completely. The present day knowledge of producing mixtures of 1:4-cis-polybutadiene and of vulcanisates of the same is based on experimental results carried out with natural rubber. If the history of development of the heating systems is considered the surprising discovery is made that these heating systems lag behind the development of the new polymers, e.g. 1:4-cis-polybutadiene and the other additions. Accordingly the same heating system was employed heretofore for natural rubber and normal synthetic rubber. The consequence is that the properties of the vulcanisates of the new polymers do not quite fulfill the requirements which are continuously increased, e.g. in the field of the technical rubber articles such as vehicle tyres, rope pulley linings and the like.

The present task is based on the problem of finding a vulcanisation system which operates without or with a minimum quantity of elementary sulphur, perhaps even only with substances giving off sulphur, and which prevents thereby an isomerisation of the 1:4-cis-polybutadiene. It is clear in this case that the ageing properties of a polymer can be improved under normal circumstances by additions of ageing protective means, metal inhibitors and the choice of the vulcanisation system. If however the configuration of the polymer is changed right from the beginning by isomerisation, these additions cannot effect an improvement of the ageing. The ageing values may admittedly exhibit the same decay for the various vulcanisates but the chemical decay mechanism during the ageing is different and depends upon various factors. The criterion for the practical use of good vulcanisation systems is good physical properties before and after ageing of vulcanisates produced by these vulcanisation systems.

It has been found that a vulcanisation system consisting of nitrogen-containing substances and sulphur-yielding substances or less than 1.5 parts of elementary sulphur, to which mercaptobenzothiazol, tetramethylthiuramidisulphide and dibenzothiacyldisulphide have been added as accelerators and mercaptobenzimidazol has been added as metal inhibitors and ageing resistor, fulfills the above-mentioned requirements made for a vulcanisation system.

Furthermore it was found that p,p'-dibenzoyl-quinonedioxim can be used advantageously as a nitrogen-containing substance. According to a further characteristic of the invention 4:4'-dithiomorpholine is particularly well suited as a sulphur-yielding substance.

The accelerators incorporated in the vulcanisation system according to the invention are matched to the other mixture components in such a manner that the polar and radical system is taken into account for the vulcanisation and a stable vulcanisate is produced. The following mixing examples A to H of a vulcanisate heated with the vulcanisation system according to the invention having the following test results illustrate well the advantages of the vulcanisate according to the invention, and thus of the vulcanisation system used therefor, compared with the mixtures V 01 and V 02 listed thereafter of previously known vulcanisates of 1:4-cis-polybutadiene and natural rubber blends and the tests results thereof.

| Recipes | Mixtures | | | |
|---|---|---|---|---|
| | A | B | C | D |
| Natural rubber | 40.0 | 40.0 | 40.0 | 40.0 |
| 1:4-cis-polybutadiene (Buna CB) | 60.0 | 60.0 | 60.0 | 60.0 |
| Intermediate super abrasion | | | | |
| Furnace soot (Corax 6) | 70.0 | 70.0 | 60.0 | 60.0 |
| Zinc oxide (zinc IRS) | 3.0 | 3.0 | 3.0 | 3.0 |
| Stearic acid | 2.0 | 2.0 | 2.0 | 2.0 |
| N-phenyl-N'-isopropyl-p-phenylenediamine (Aldol 4010 NA) | 1.5 | 1.5 | 1.5 | 1.5 |
| Phenyl-α-naphthylamine (phenyl alpha) | 1.0 | 1.0 | 1.0 | 1.0 |
| Mercaptobenzimidazol (Weis MB) | 1.0 | 1.0 | 1.0 | 1.0 |
| Binder (KO-resin) a condensation resin of acetylene and tertiary-butylphenol | 5.0 | 5.0 | 5.0 | 5.0 |
| Plasticizer (naftolen) an aromatic oil | 18.0 | 18.0 | 12.0 | 12.0 |
| 4:4'-dithiomorpholine (sulfasan R) | 0.6 | | 0.6 | |
| Oil sulphur 0.2 (10 parts of oil to 100 parts of sulphur) | | 0.55 | | 0.55 |
| Mercaptobenzothiazol (vulkazit C) | 0.5 | 0.5 | 0.5 | 0.5 |
| Tetramethylthiuramdisulphide (Vulkazit Th) | 0.1 | 0.1 | 0.1 | 0.1 |
| Dibenzothiacyldisulphide (Vulkazit M) | 2.0 | 2.0 | 2.0 | 2.0 |
| p:p'-dibenzoyl-quinonedioxime (Dibenzo GMF) | 1.5 | 1.5 | 1.5 | 1.5 |

| | Test results | | | | | | | |
|---|---|---|---|---|---|---|---|---|
| | A | | B | | C | | D | |
| Curing at 143° C | 45' | 60' | 45' | 60' | 45' | 60' | 45' | 60' |
| Modulus at 300% | 66 | 68 | 96 | 98 | 62 | 61 | 98 | 101 |
| Modulus at 500% | 120 | 124 | | | 120 | 121 | 172 | |
| Tension resistance | 125 | 128 | 108 | 156 | 142 | 150 | 172 | 164 |
| Break elongation | 520 | 525 | 485 | 460 | 595 | 615 | 505 | 465 |
| Shore hardness | 65 | 66 | 71 | 71 | 63 | 65 | 68 | 70 |
| Elasticity | 25 | 26 | 27 | 27 | 28 | 30 | 30 | 31 |
| Indentation resistance | 31 | 35 | 24 | 31 | 40 | 36 | 29 | 22 |
| Tear resistance | 69 | 81 | 88 | 91 | 83 | 77 | 75 | 70 |
| Mooney t₅ | 10' | | 27½' | | 14½' | | 29' | |
| Ageing 3 days at 100° C.: | | | | | | | | |
| Modulus at 300% | 86 | 88 | 128 | 122 | 81 | 77 | 130 | 124 |
| Modulus at 500% | | | | | 140 | 134 | | |
| Tension resistance | 132 | 132 | 144 | 170 | 152 | 138 | 150 | 154 |
| Break elongation | 455 | 465 | 345 | 375 | 550 | 520 | 350 | 365 |
| Shore hardness | 66 | 60 | 73 | 72 | 64 | 63 | 72 | 71 |
| Elasticity | 23 | 23 | 27 | 27 | 28 | 28 | 31 | 30 |
| Indentation resistance | 30 | 26 | 20 | 18 | 33 | 34 | 15 | 19 |
| Tear resistance | 84 | 69 | 68 | 66 | 70 | 82 | 52 | 64 |

| Recipes | Mixtures | | | |
|---|---|---|---|---|
| | E | F | G | H |
| Natural rubber | 40.0 | 40.0 | 40.0 | 40.0 |
| 1:4-cis-polybutadiene (Buna CB) | 60.0 | 60.0 | 60.0 | 60.0 |
| Intermediate super abrasion | | | | |
| Furnace soot (Corax 6) | 60.0 | 60.0 | | 70.0 |
| High abrasive furnace soot (Corax 3) | | | 70.0 | |
| Zinc oxide (zinc IRS) | 3.0 | 3.0 | 3.0 | 3.0 |
| Stearic acid | 2.0 | 2.0 | 2.0 | 2.0 |
| N-phenyl-N'-isopropyl-p-phenylenediamine (Aldol 4010 NA) | 1.5 | 1.5 | 1.5 | 1.5 |
| Phenyl-α-naphthylamine (Phenyl Alpha) | 1.0 | 1.0 | 1.0 | 1.0 |
| Mercaptobenzimidazol (Weis MB) | 1.0 | 1.0 | 1.0 | 1.0 |
| Binder (KO-resin), a condensation resin of acetylene and tertiary-butylphenol | 5.0 | 5.0 | 5.0 | 5.0 |
| Softener (Naftolen) an aromatic oil | 18.0 | 18.0 | 25.0 | 25.0 |
| 4:4'-dithiomorpholine (Sulfasan R) | 0.6 | | 0.6 | |
| Oil sulphur 0.2 (10 parts of oil to 100 parts of sulphur) | | 0.55 | 0.33 | 0.44 |
| Mercaptobenzothiazol (Vulkasit C) | 0.5 | 0.5 | 0.5 | 0.5 |
| Tetramethylthiuramdisulphide (Vulkazit Th) | 0.1 | 0.1 | 0.1 | 0.1 |
| Dibenzothiacyldisulphide (Vulkazit M) | 2.0 | 2.0 | 2.0 | 2.0 |
| p,p'-Dibenzoyl-quinonedioxime (Dibenzo GMF) | 1.5 | 1.5 | 1.5 | 1.5 |

| | Test results | | | | | | | |
|---|---|---|---|---|---|---|---|---|
| | E | | F | | G | | H | |
| Curing at 143° C | 45' | 60' | 45' | 60' | 45' | 60' | 45' | 60' |
| Modulus at 300% | 64 | 64 | 88 | 86 | 88 | 84 | 80 | 82 |
| Modulus at 500% | 126 | 126 | | 158 | 166 | 182 | 146 | 150 |
| Tension resistance | 160 | 158 | 154 | 161 | 166 | 104 | 166 | 160 |
| Break elongation | 625 | 615 | 485 | 505 | 510 | 530 | 565 | 535 |
| Shore hardness | 61 | 61 | 66 | 68 | 63 | 65 | 67 | 67 |
| Elasticity | 30 | 31 | 35 | 33 | 40 | 38 | 36 | 37 |
| Indentation resistance | 37 | 37 | 28 | 24 | 23 | 22 | 27 | 35 |
| Tear resistance | 80 | 75 | 78 | 75 | 74 | 69 | 88 | 84 |
| Mooney $t_5$ | 9' | | 27' | | Over 30' | | | |
| Ageing 3 days at 100° C.: | | | | | | | | |
| Modulus at 300% | 84 | 84 | 116 | 116 | 114 | 120 | 108 | 116 |
| Modulus at 500% | | | | | | | | |
| Tension resistance | 140 | 154 | 146 | 145 | 146 | 136 | 147 | 153 |
| Break elongation | 480 | 505 | 375 | 380 | 380 | 340 | 415 | 410 |
| Shore hardness | 63 | 62 | 70 | 70 | 66 | 67 | 70 | 70 |
| Elasticity | 37 | 39 | 44 | 42 | 40 | 42 | 39 | 39 |
| Indentation resistance | 28 | 26 | 13 | 15 | 24 | 18 | 19 | 22 |
| Tear resistance | 87 | 88 | 65 | 64 | 62 | 65 | 74 | 91 |

| Recipes | Mixtures | |
|---|---|---|
| | V 01 | V 02 |
| 1:4-cis-polybutadiene (Buna CB) | 60.0 | 60.0 |
| Natural rubber | 40.0 | 40.0 |
| Intermediate super abrasion | | |
| Furnace soot (Corax 6 ISAF) | 60.0 | 60.0 |
| Zinc oxide (zinc IRS) | 3.0 | 3.0 |
| Stearic acid | 2.0 | 2.0 |
| N-phenyl-N'-isopropyl-p-phenylenediamine (Aldol 4010 NA) | 1.5 | 1.5 |
| Phenyl-α-naphthylamine (Phenyl alpha) | 1.0 | 1.0 |
| N-phenyl-N'-cyclohexyl-p-phenylene diamine (Aldol 4010) | 1.0 | 1.0 |
| Binder (KO resin), a condensation resin of acetylene and tertiary-butyl-phenol | 5.0 | 5.0 |
| Plasticizer (Naftolen) an aromatic oil | 12.0 | 12.0 |
| Oil sulphur 0.2 (10 parts of oil to 100 parts of sulphur) | 2.2 | 1.65 |
| N-oxydiethylene-benzothiacylsulphenamide (Santocure MOR) | 1.5 | 1.5 |

| | Test results | | | |
|---|---|---|---|---|
| | V 01 | | V 02 | |
| Curing at 143° C | 45' | 60' | 45' | 60' |
| Modulus at 300% | 86 | 82 | 80 | 79 |
| Modulus at 500% | 174 | 170 | 171 | 170 |
| Tension resistance | 181 | 186 | 191 | 192 |
| Break elongation | 515 | 535 | 540 | 545 |
| Shore hardness | 60 | 42 | 41 | 40 |
| Elasticity | 39 | 42 | 41 | 40 |
| Ageing 3 days at 100° C.: | | | | |
| Modulus at 300% | | | | |
| Modulus at 500% | | | | |
| Tension resitance | 124 | 132 | 118 | 112 |
| Break elongation | 235 | 255 | 245 | 240 |
| Shore hardness | 72 | 70 | 71 | 70 |
| Elasticity | 42 | 45 | 37 | 38 |
| Mooney $t_5$ | 28' | | 27' | |

The foregoing test results show that the physical values of the vulcanisate before and after ageing have a quality which could not be achieved with the conventional methods. The 4:4'-dithiomorpholine contained in the vulcanisation system presents the occurrence of isomerisation, as well as the small quantity of elementary sulphur contained in the mining examples A, C and E.

If nevertheless, a small amount of isomerisation should have occurred in the one or the other example A to H, this small isomerisation substantially does not effect the physical values resulting before and after ageing. It is known that a small proportion of the trans-form improves the cold properties of natural rubber. Applied to 1:4-cis-polybutadiene this means, therefore, that here, too, a small quantity of the trans-form is advantageous. Obviously the various kinds of bands in a vulcanisate have different functions. The production of only one bond is, therefore, not advisable, since mostly each bond affects one physical property favourably, another physical property however, unfavourably. For this reason, the complex system expressed by the mixtures A to H is not only desirable, but may even be required in respect of the necessary plural bonds.

The sulphur-yielding substance (4:4'-dithiomorpholin) contained in the vulcanisation system according to the invention causes a short Mooney initial vulcanisation; elementary sulphur, in contrast, causes a higher Mooney value. As an explanation for this it is assumed that the sulphur-yielding substance (4:4'-dithiomorpholine) and the nitrogen-containing substance (p:p'-dibenzoyl-quinonedioxime) react with each other and form an active product, which in turn reacts with the rubber molecules.

The effect of the small proportion of elementary sulphur in individual mixtures is good. Modulus, strength and the other physical properties are better, neglecting a slightly reduced cutting resistance when compared with the mixtures containing the sulphur-yielding substances (4:4'-dithiomorpholine).

An interesting feature is that the elementary sulphur in the vulcanisation system in accordance with the invention not only acts as vulcanising agent but also as a retarding agent.

In summary it may be stated that the vulcanisate of a blend of 1:4-cis-polybutadiene and natural rubber produced by using the vulcanisation system in accordance with the invention is highly suitable for practical use in

I claim:

Mixture for improving the chemico-physical properties of blends comprising natural rubber and 1:4-cis-polybutadiene having 1 to 98% cis-content characterized by a vulcanisation system comprising p:p'-dibenzoylquinonedioxime and 4:4'-dithiomorpholine and at most 1.5 parts of elementary sulphur, to which system mercaptobenzothiazol, tetramethylthiouramide sulphide and dibenzolthiazyldisulphide have been added as accelerators and also mercaptobenzimidazol as metal inhibitors and aging resistors.

References Cited by the Examiner

UNITED STATES PATENTS 3,060,989  10/1962  Railsback et al. _____ 260—5

OTHER REFERENCES

Wilson, B. J.: British Compounding Ingredients for Rubber, 1958, (pp. 6 and 10).

MURRAY TILLMAN, *Primary Examiner.*

D. J. BREZNER, *Assistant Examiner.*